Figure 1:
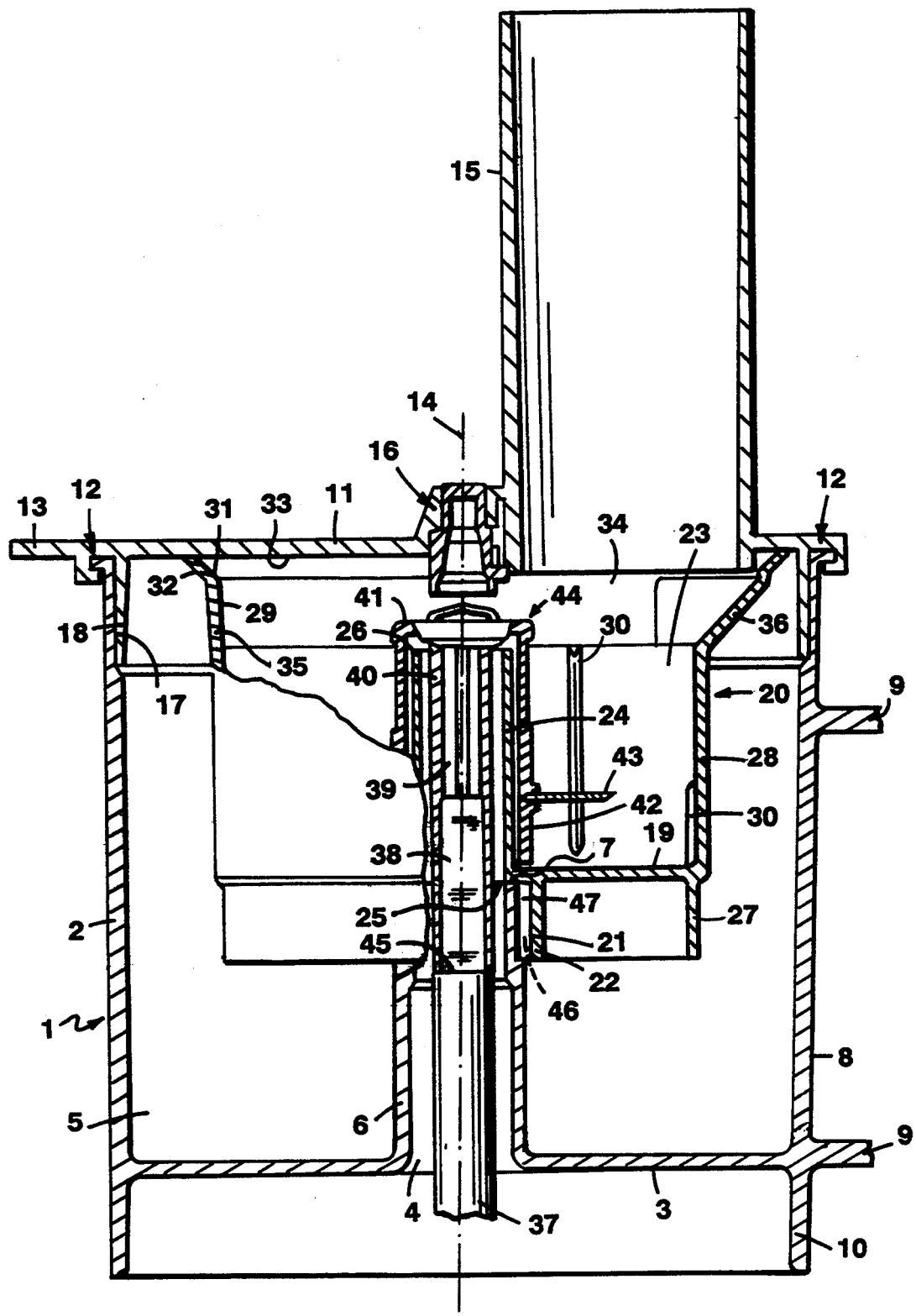

United States Patent
Hackel et al.

[11] Patent Number: 5,395,060
[45] Date of Patent: Mar. 7, 1995

[54] MULTI-PURPOSE FOOD PROCESSOR

[75] Inventors: Simone Hackel, Limburgerhof; Volker Ullrich, Hanau; Karl-Heinz Kamprath, Wiesbaden, all of Germany

[73] Assignee: Braun Aktiengesellschaft, Frankfurt, Germany

[21] Appl. No.: 976,988

[22] PCT Filed: Jul. 18, 1991

[86] PCT No.: PCT/DE91/00599
    § 371 Date: Jan. 28, 1993
    § 102(e) Date: Jan. 28, 1993

[87] PCT Pub. No.: WO92/02168
    PCT Pub. Date: Feb. 20, 1992

[30] Foreign Application Priority Data

Aug. 3, 1990 [DE] Germany .......... 40 24 684.1

[51] Int. Cl.⁶ ............................. B02C 18/12
[52] U.S. Cl. .................. 241/92; 241/199.12; 241/282.2
[58] Field of Search ............ 241/92, 282.1, 282.2, 241/199.12

[56] References Cited

U.S. PATENT DOCUMENTS

| | | |
|---|---|---|
| 2,785,547 | 3/1957 | Barros . |
| 3,537,691 | 11/1970 | Tsuruta et al. ......... 241/282.2 |
| 3,739,490 | 5/1973 | Oberg ................. 241/282.2 |
| 3,892,365 | 7/1975 | Verdun . |
| 4,194,697 | 3/1980 | Lembeck . |
| 4,586,666 | 5/1986 | Fox . |
| 4,589,599 | 5/1986 | Williams ............ 241/282.2 X |
| 4,770,217 | 9/1988 | Strong .................. 241/92 X |
| 5,018,675 | 5/1991 | Gateaud ............... 241/282.2 |
| 5,236,135 | 8/1993 | Wilson et al. ......... 241/282.2 X |

FOREIGN PATENT DOCUMENTS

| | | |
|---|---|---|
| 212852 | 3/1989 | European Pat. Off. ....... 241/92 |
| 513144 | 11/1930 | Germany . |
| 335813 | 1/1959 | Switzerland . |
| 340320 | 8/1959 | Switzerland . |
| 2148101 | 5/1985 | United Kingdom . |
| 2177289 | 1/1987 | United Kingdom . |
| WO/89/008-27 | 2/1989 | WIPO . |

*Primary Examiner*—Frances Han
*Attorney, Agent, or Firm*—Fish & Richardson

[57] ABSTRACT

A multi-purpose kitchen appliance comprising a first container closable by a cover in which a first driven working utensil can be inserted for processing food stuffs which can be coupled via a first connector with a drive spindle projecting through the base of the electric motor in the multi-purpose kitchen appliance. A second, smaller container may be inserted into the first container. A second utensil in the second container can be coupled to the drive spindle via a second connector. A sealing lip is arranged on the edge of the aperture of the second container which, when the latter is inserted in the first container, forms a seal on the underside of the cover when the cover is fitted on the first container.

12 Claims, 1 Drawing Sheet

MULTI-PURPOSE FOOD PROCESSOR

This invention relates to a multi-purpose food processor having a first cylindrical container adapted to be closed by a cover and suitable for insertion of a first driveable processing tool for processing food materials, the first tool being adapted to be coupled by means of a first coupling device to a driving shaft which extends through the bottom of the first container and is adapted to be driven by an electric motor arranged in the housing of the multi-purpose food processor, with a second cylindrical container of a smaller volumetric capacity being insertable into the first container prior to it being closed, and with a second driveable processing tool being insertable through a second container filler opening for processing food materials of smaller quantities, the second tool being adapted to be coupled to the driving shaft by means of a second coupling device, and with the cover, on closing the first container, closing at the same time the filler opening of the second container.

A multi-purpose food processor is already known from U.S. Pat No. 4,586,666. When it is desired to chop small quantities of foodstuffs as, for example, parsley or onions, this is hardly possible in the first large-volume container because in the processing of small quantities of food, these are flung against the large inner wall surface of the first container, clinging thereto or collecting on the bottom, so that the cutting blade arranged at a small relative distance to the inner wall and the bottom of the first container is then no longer in a position to seize the food for further processing. To avoid this, a second container of smaller volumetric capacity is inserted into the first container to enable also very small quantities of food to be chopped sufficiently well.

To prevent the food items contained in the second container from being expelled into the first container during processing, the second container is closed by a second lid. Not only does the second lid increase the manufacturing cost of the multi-purpose food processor, it also makes manipulation more difficult, since it invariably requires the second lid to be placed down on the second container, in addition to setting the first lid in place. For example, in the event of an operator's failure to place the second lid down onto the second container, the food material is also expelled into the first container, making processing impossible, apart from contaminating the first container.

Further, from WO 89/00827 a food processor according to the prior-art portion of claim 1 is known in which a second container of a substantially smaller diameter than the first container sits non-rotatably on the forward end of a sleeve centrally disposed in the first container. When the first container is closed by the lid in this multi-purpose food processor, the free rim of the second container becomes engaged by an annular collar formed on the underside of the lid, causing also the second container to be closed by the lid.

In this known multi-purpose food processor, it is to be considered less advantageous that the manufacturing tolerances occurring in the manufacture of the containers and the lid make it impossible in practice to effectively close the second container by the lid, because both the dimension between the outer wall of the second container and the annular collar on the lid in the radial direction and the dimension between the rim of the second container and the underside of the lid in the axial direction will practically never be able to be zero millimeters, so that a clearance is invariably present. This clearance allows the passage of food materials. Accordingly, when mixing drinks in the second container or processing condiments to a very fine degree (powdery), not only the liquid but also the processed food items will find their way over the upper rim of the second container into the first container. Due to the inevitable clearance between the annular collar on the lid and the rim of the second container, vibrations occurring on the second container during the processing operation are transmitted through the rim to the annular collar of the lid, producing an unpleasant rattling or running noise level in this multi-purpose food processor.

It is therefore an object of the present invention to provide a multi-purpose food processor in which the above-mentioned disadvantages, particularly the passage of food material from the second container into the first container, are eliminated and in which vibrations occurring on the first and second container during the processing of food materials are absorbed by the second container in a simple manner, thus avoiding noise.

According to a first embodiment of the present invention, this object is accomplished in that a circumferential, resiliently deformable sealing lip is arranged on the second container in the area of the filler opening, and that the sealing lip, with the second container nested within the first container and the cover closing the first container, is resiliently deformed by the underside of the cover such as to be in sealing engagement with the underside of the cover. The provision of a resiliently deformable sealing lip on the second container eliminates entirely any leakage between the cover and the second container during operation of the multi-purpose food processor, thus avoiding contamination of the first container by the food materials processed in the second container. Any vibrations acting on the container during the processing of food items are largely absorbed by the sealing lip, thus making for a substantially quieter running of the multi-purpose food processor of the invention also in cases where both containers are nested within each other. The sealing lip affords particular ease of manufacture when it is arranged on the rim bounding the filler opening of the second container.

To ensure an optimum and resilient deformation of the sealing lip, the sealing lip diverges outwardly in conical fashion. However, it can also be considered that the sealing lip tapers conically inwardly, or that the sealing lip is formed by an annular torus becoming radially or laterally expanded or deformed by the axial compression force of the second container.

The sealing lip may be fitted to the end remote from the second container in a subsequent operation with particular ease. However, it may also be contemplated to provide the sealing lip on the outer wall or on the inner wall of the second container from where it then extends up to the cover.

In a further feature of the present invention, the sealing lip is affixed to the rim of the second container in a particularly simple manner by hot-molding it thereto. This may be accomplished applying either the single- or the two-component molding technique, the single-component molding technique involving hot-molding of the sealing lip onto the cold rim after molding of the second container, thus producing an intimate connection by fusing the rim of the second container. In the two-component molding technique, after molding the second container the mold is changed on the same molding machine to subsequently hot-mold the sealing lip onto the still warm rim of the second container. It will be understood that it may also be considered to join the sealing lip to the rim of the second container following its molding by adhesive bonding or to cold-mold it thereon, for example, by means of silicone, etc.

As a material for the application of the above-mentioned molding technique for manufacturing the sealing lip, a thermoplastic elastomer has proven to be particularly advantageous, while the second container is made of polypropylene which cures after being hot-molded and is rigid when cold, having accordingly only little resilience.

In a second embodiment of the present invention, it is particularly advantageous that a resiliently deformable sealing lip projects from the cover in the area of the rim of the filler opening of the second container, and that the sealing lip, with the second container nested within the first container and the cover closing the first container, is resiliently deformed by the rim of the second container such as to be in sealing engagement with the rim of the second container.

By providing the sealing lip on the underside of the cover, a seal of equally good quality results between the cover and the second container. In this embodiment, too, the resiliently deformable sealing lip may be of a conically diverging or conically tapering configuration. It may also be considered that provision is made for a respective resiliently deformable sealing lip on both the cover and the second container, the lips acting on each other in a sealing manner following their resilient deformation when the second container is used.

Advantageously, both embodiments provide a first aperture in the bottom of the first container, the first aperture is surrounded by a first sleeve projecting into the first container, the driving shaft extends into the first sleeve, a second aperture is provided in the bottom of the second container, the second aperture is surrounded by a second sleeve projecting into the second container, the second container is seatable on the free end of the first sleeve, the second coupling device of the second processing tool is comprised of a tube which extends through the second sleeve, is seatable on the free end of the driving shaft and encompasses it, the tube being adapted to be coupled to the driving shaft in a non-rotating relationship by an engagement means provided between the driving shaft and the tube. This enables the second container to be directed to the driving mechanism with particular ease, and the second container seats and centers on the first container readily, so that the sealing lip is at all times in uniform engagement with the cover. Good centering and mounting of the second container on the first container in a non-rotatable relationship is accomplished by providing in the bottom a tubular well with teeth for receiving the free end of the first sleeve, the teeth meshing with teeth provided on the first sleeve.

To ensure that the drive motor is not energized until the cover is closed to prevent injury when using a cutting blade as the processing tool, a further feature of the invention provides an actuating cam formed on the cover to unlock an interlocking device arranged in the multi-purpose food processor when the first container is closed, so that the electric motor cannot be energized until the first container is securely closed.

To be able to introduce food materials into the closed second container through the feed channel, the cover advantageously includes a feed channel for filling food into the container, and the feed channel is mounted on the cover such that its imaginary extension opens into the second container.

A sole embodiment of the present invention is illustrated in the accompanying drawing and will be described in more detail in the following.

The sole FIGURE shows in longitudinal section only the container arrangement, while the remainder of the multi-purpose food processor as known, for example, from GB-2 177 289 A and as suitable for application to the container arrangement of the invention, is not illustrated for reasons of simplicity.

The first container 1 comprises a wall 2 of circular cross section in the form of a hollow cylinder. The bottom 3 of the first container 1 includes a first aperture 4 closed off by a first sleeve 6 projecting into the container interior 5 in order to prevent liquid food from leaking out of the container when the liquid is below a maximum filling level. The maximum filling level of the first container 1 thus corresponds to the free end 7 of the first sleeve 6.

Integrally formed on the outer wall 8 of the first container 1 is a U-shaped handle 9 shown only in fragments. Adjoining the bottom 3 in downward direction when viewing the drawing is an annular collar 10 which serves a centering function when the first container 1 is seated on a drive structure, not shown, of a multi-purpose food processor.

The first container 1 is lockable by means of a bayonet catch 12 provided on the cover 11. With the cover properly locked in place, an actuating cam 13 projecting radially on the cover 11 engages into a slot, not shown, on the multi-purpose food processor, thereby unlocking an interlocking device which is the prerequisite for starting operation of the food processor.

Radially outside the center 14 of the cover 11, a tubular feed channel 15 extends upwardly when viewing the drawing, the feed channel serving to introduce food materials into the container successively during operation of the multi-purpose food processor, to be subsequently processed or chopped by the first or second processing tool. In the center of the cover 11, a centering device 16 is provided which serves the function of centrally locating the free end of a processing tool producing a major tilting moment, such as dough hook, shredding disk, etc., which however cannot be inserted into the first container 1 because the second container 20 is nested within the first container 1. To enable the cover 11 to be readily centered when placed down on the first container 1, an annular collar 18 extending into the container interior and resting against the inner wall 17 thereof is integrally formed on the cover 11.

The bottom 19 of the second container 20 bears against the free end 7 of the first sleeve 6, centering itself by means of a bore 21 provided in the bottom 19 of the second container 20 and formed by a tubular well 22. Teeth 46 are provided radially within the bore 21. Extending from the bottom 19 into the container interior 23 is a second sleeve 24 closing off the second aperture 25 provided in the bottom 19 of the second container 20, so that only food that exceeds the maximum filling level may escape through the free end 26 of the second sleeve 24. The teeth 46 are in mesh with teeth 47 formed on the first sleeve 6 in a non-rotating relationship to lock the container 20 against rotation.

Adjoining the bottom 19 of the second container 20 in downward direction when viewing the drawing is a second annular collar 27 of a diameter corresponding essentially to that of the tubular wall 28 of the second container 20 and terminating with its free end level with, or slightly beyond, the free end of the tubular well 22, thereby ensuring a safe supporting surface for the second container 20. Rib members 30 spaced over the circumference and extending in longitudinal direction parallel to the center line 14 are arranged on the inner wall 29 of the second container 20.

Molded onto the end 31 bounding the second container 20 in upward direction is a resilient sealing lip 32 which diverges conically towards the cover 11 and is in sealing and slightly biased engagement with the underside 33 of the cover 11 proximate to the container interior 23 of the second container 20, thereby closing the filler opening 34 and thus the second container 20 from above. While the rim 35 extends in the manner of a circular ring in the area of the end 31 of the second container 20 outside the feed channel 15, it widens by means of the conical surface area 36 in order to ensure that the feed channel 15 arranged outside the center 14 opens exclusively into the second container 20 when in use. Also the sealing lip 32 widens in this area, thus resting flush against the cover 11.

Underneath the bottom 3 of the first container 1, a driving shaft 37 coupled to the drive mechanism of the food processor projects into the first aperture 4, the shaft extending through the first sleeve 6 and having an engagement means at its free end in the form of a hexagon 38. Seated on the hexagon 38 in a non-rotatable relationship is a tube 40 equally provided with a hexagon 39 and connected by means of a bridge member 41 to a second tube 42 concentrically surrounding the second sleeve 24 from outside. The second tube 42 terminates in close proximity to the bottom 19 of the second container 20. Two crescent-shaped cutting blades 43 are secured to the second tube 42. The cutting blades 43 are arranged in a diametrically opposite relationship on the second tube 42 and are molded integrally with the second tube 42 if the two tubes 40, 42 are integrally molded of plastics. The parts 40, 41, 42 and 43 combine to form a processing tool 44 for the second container 20. With the free end of the first tube 40, the processing tool 44 takes support upon a step 45 provided on the driving shaft 37.

The mode of operation of the multi-purpose food processor of the present invention is as follows:

When it is desired to chop, mix or knead major quantities of food materials, only the first container 1 is used. The processing tool (not shown) is then placed into the first container 1 having the larger dimensions and is seated down onto the driving shaft 37. After the cover 11 is closed, processing of the food materials may be started.

When it is desired to chop only very small quantities of food as, for example, parsley, onions, garlic, etc., the second container 20 is set in place on the first sleeve 6 such that the bottom 19 bears against the free end 7 of the first sleeve 6, causing the tubular well 22 to surround the first sleeve 6 concentrically. Subsequently, the processing tool 44 suitable for the second container 20 is coupled to the driving shaft 37. The next step involves seating the cover 11 on the first container 1 such as to enable the bayonet catch 12 to engage the interlocking device of the food processor. At the same time, the underside 33 of the cover will engage the free end of the sealing lip 32 which will experience a slight outward and downward pressure and, as this occurs, a biasing force until the cover 11 has reached its proper locked position. At this instant, the cover 11 will have closed both the first and the second container 1, 20.

Food materials may then be introduced through the feed channel 15, to be subsequently chopped by the processing tool 44 rotated by the driving shaft 37 on turning on the food processor. Owing to the small diameter and the low height of the second container 20 (low volumetric capacity), all food materials, no matter how small, will be seized by the cutting blades 43 which are at a very small distance to the container wall 28 and the bottom 19. This effect is further enhanced by the rib members 30 provided on the second container 20, as they decelerate the food rotated by the processing tool 44, directing it back again to the cutting blades 43.

We claim:

1. A multi-purpose food processor comprising a first cylindrical container, a driving shaft extending through the bottom of said first container and adapted to be driven by an electric motor arranged in said multi-purpose food processor, said driving shaft having a first coupling device for receiving of a first driveable food material processing tool suitable for insertion in said first container and coupling said first tool to said driving shaft, a cover for said first container, a second cylindrical container of smaller volumetric capacity than said first container, said second container being insertable into said first container prior to said first container being closed by said cover, said second container having a filler opening, a second driveable processing tool adapted to be inserted through said second container filler opening for processing food materials of smaller quantities, a second coupling device for coupling said second tool to said driving shaft, said cover, on closing said first container, closing at the same time said second container filler opening, and a circumferential, resiliently deformable sealing lip structure on said second container in the area of said second container filler opening, said sealing lip structure diverging outwardly in conical fashion, said sealing lip structure with said second container nested within said first container and said cover closing said first container being resiliently deformed by the underside of said cover such as to be in sealing engagement with said underside of said cover.

2. A multi-purpose food processor comprising a first cylindrical container, a driving shaft extending through the bottom of said first container and adapted to be driven by an electric motor arranges in said multi-purpose food processor, said driving shaft having a first coupling device for receiving a first driveable food material processing tool suitable for insertion in said first container and coupling said first tool to said driving shaft, a cover for said first container, a second cylindrical container of smaller volumetric capacity than said first container, said second container being insertable into said first container prior to said first container being closed by said cover, said second container having a filler opening, a second driveable processing tool being adapted to be inserted through said second container filler opening for processing food materials of smaller quantities, a second coupling device for coupling said second tool to said driving shaft, said cover, on closing said first container, closing at the same time said second container filler opening, said second container filler opening having a rim, a resiliently deformable sealing lip structure projecting from said cover in the area of said rim of said filler opening of said second container, said sealing lip structure diverging outwardly in conical fashion and being resiliently deformed by said rim of said second container and in sealing engagement with said rim of said second container when said second container is nested within said first container and said cover closes said first container.

3. The multi-purpose food processor of claim 1 wherein said second container filler opening has a rim and said resiliently deformable sealing lip structure is arranged on said rim.

4. The multi-purpose food processor of claim 3 wherein said rim has an edge portion, and said resiliently deformable sealing lip structure is affixed to said edge portion of said rim.

5. The multi-purpose food processor of either claim 3 or 4 wherein said resiliently deformable sealing lip structure is hot-molded onto said rim.

6. The multi-purpose food processor of claim 2 wherein said resiliently deformable sealing lip structure is hot-molded onto the underside of said cover.

7. The multi-purpose food processor of claim 2, 3, or 4 wherein said resiliently deformable sealing lip structure is made of a thermoplastic elastomer on a polypropylene base, and said second container is made of polypropylene.

8. The multi-purpose food processor of either claim 1 or 3 wherein a first aperture is provided in the bottom of said first container, said first container includes a first sleeve that projects into said first container and surrounds said first aperture, said driving shaft extends into said first sleeve, a second aperture is provided in the bottom of said second container, said second container includes a second sleeve that projects into said second container and surrounds said second aperture, said second container is seatable on the free end of said first sleeve, and said second coupling device includes tube structure that is adapted to extend through said second sleeve and to seat on and encompass the free end of said driving shaft, said tube structure including engagement means adapted to be coupled to said driving shaft in a non-rotating relationship.

9. The multi-purpose food processor of claim 8 and further including bore structure in said bottom of said second container for receiving the free end of said first sleeve.

10. The multi-purpose food processor of either claim 1 or 2 wherein said first processing tool is a cutting blade.

11. The multi-purpose food processor of either claim 1 or 2 and further including an inter-locking device in the multi-purpose food processor and an actuating cam on said cover for unlocking when said first container is closed, so that the electric motor cannot be energized until said first and said second containers are securely closed by said cover.

12. The multi-purpose food processor of either claim 1 or 2 wherein said cover includes feed channel structure for introducing food into said containers, said feed channel structure being disposed on said cover such that an imaginary extension of said feed channel extends into said second container.

* * * * *